United States Patent Office 3,248,210
Patented Apr. 26, 1966

1

3,248,210
MELTING PROCESS
Richard S. De Fries, Latham, and Paul S. Methé, Cohoes, N.Y., assignors to Allegheny Ludlum Steel Corporation, Brackenridge, Pa., a corporation of Pennsylvania
Filed Dec. 13, 1961, Ser. No. 159,075
4 Claims. (Cl. 75—10)

This invention relates to improvements in consumable electrode melting, and relates in particular to improvements in consumable electrode melting of nitrogen-bearing metals. This is a continuation-in-part of application Serial No. 11,329, filed February 26, 1960, now abandoned.

In the production and melting of metals and alloys the necessity of providing homogeneous uniform ingots varies with the type of metal, alloy and ultimate properties required. With some metals and alloys it is extremely difficult to obtain commercially pure metal ingots of uniform chemical analysis by conventional furnace melting and pouring methods. For example, reactive metals such as molybdenum, titanium, zirconium, uranium and alloys thereof must be melted under rigidly controlled atmospheric conditions and thus must be produced by arc melting in an atmosphere that is non-contaminating to the metal being melted, such atmosphere being an inert gas or a vacuum or partial vacuum or by sintering particulate materials in a controlled atmosphere or by similar methods. The conventional melting practices frequently result in ingots that exhibit considerable alloy segregation and large quantities of non-metallic inclusions. Methods of remelting electrodes of these materials in order to secure uniformity of chemical analysis and to reduce the quantity of impurities inherent in the metals produced in a conventional manner are well known. The most common and commercially practical method developed consists of consumable arc melting of metal electrodes in a substantial vacuum, the electrodes having been prepared by more conventional means, such as by air melting. The method of vacuum remelting has been found to be highly advantageous in securing sound and uniform ingots substantially free of non-metallic inclusions and alloy segregation. This method is employed for the production of many metals and alloys as well as the aforementioned reactive metals. For example, the method is presently employed in securing sound steel ingots, particularly highly alloyed steel, stainless steels and superalloys including non-ferrous base alloys, such as nickel and cobalt-base alloys.

Furnaces designed to effect vacuum electrode melting, sometimes called the consumable electrode process, are generally composed of a vertically mounted ram to which is clamped the electrode to be melted. The ram extends downwardly into a vacuum chamber and projects the electrode before it which is thus propelled into a vacuum sealed crucible where it is consumably arc melted. An example of such a consumable electrode furnace is shown in detail in United States Patent No. 2,900,556 issued August 18, 1959 to Paul B. Gifford.

The use of a vacuum for such consumable arc melting is greatly preferred to the use of inert gases such as argon or nitrogen, in that if such melting is conducted in the presence of such gaseous atmospheres the arc is highly erratic, the voltage and amperage vary so that the automatic controls driving the electrode into the crucible are constantly adjusting the position of the electrode in seeking proper arc melting conditions. Such an erratic and unstable arc causes excessive wear on rectifiers, drive motors and other components of the furnace. Additionally, such an erratic arc cannot be observed through the crucible sight port (where such a port is provided), because during arc melting the crucible zone in the vicinity of the arc is obscured from the operator's vision by a build-up of fine metallic dust particles. Consequently, adequate manual control of the arc melting cannot be maintained. Under such conditions, the clamp is frequently damaged while melting by being partially melted or over-heated. On the other hand, when vacuum melting, the vacuum draws-out these particles, permitting full vision of the arc. The adverse melting conditions are caused by the presence or partial presence of any of the inert static gaseous atmospheres. Such conditions exist even if only a partial atmosphere of nitrogen, argon or other inert atmosphere is employed although the over-all gaseous pressure within the melting crucible is below 1 atmosphere.

In addition to the aforementioned disadvantages of using static gaseous atmospheres, arc melting under a vacuum effects a much cleaner product than arc melting in the presence of an inert gas. Sonic rejections are practically eliminated by vacuum melting, while melting under an argon atmosphere decreases the yield of sound metal from about 15% to 20% due to inclusions and segregations.

Melting in the presence of a vacuum effects the extraction of practically all gaseous elements dissolved in or present in the metal being remelted. Such phenomenon is generally desirable since gaseous elements such as hydrogen or oxygen are undesirable constituents; however, in some instances nitrogen is a desired and required alloying ingredient and, consequently, consumable electrode melting in a vacuum is not practical since a necessary alloying ingredient is removed from the composition during arc remelting. A positive or partial gaseous atmosphere such as an argon and/or nitrogen atmosphere can be employed to maintain or raise the nitrogen content of the metal being consumably arc remelted; however, the disadvantages of employing such atmospheres statically, as set forth above, outweigh any of the advantages gained.

It has now been found that by employing the method of the present invention, metal electrodes such as iron, nickel and cobalt-base alloy electrodes that contain nitrogen as a necessary alloying ingredient, may be consumably electrode melted in the presence of a partial nitrogen atmosphere while maintaining a stable arc, providing a clean product and while maintaining, raising or lowering the nitrogen content of the alloy.

In general, the present invention is the consumable electrode remelting of nitrogen-bearing metals and alloys wherein the cast electrodes are continuously arc melted in a vacuum chamber while continuously evacuating to maintain a vacuum within said chamber but while simultaneously and continuously flowing gaseous nitrogen through the vacuum chamber. Preferably nitrogen is conducted through the vacuum chamber at a rate that will maintain a nitrogen pressure within the chamber equivalent to that required to elevate a column of mercury to about 5 to 50 millimeters. A vacuum pump must continue to remove the nitrogen gas while the gas is being continuously introduced at a rate of from about 10 to 60 cubic feet of gas per hour and in most instances preferably at a rate of about 30 to 40 cubic feet of gas per hour.

It is, therefore, an object of the present invention to provide a process wherein nitrogen-bearing metals may be remelted by the consumable electrode process while controlling the nitrogen content of the metal within its desired limits and maintaining a stable arc during the remelting.

It is a further object of the present invention to provide a method of consumable electrode remelting of nitrogen-bearing metals and alloys wherein a nitrogen-vacuum atmosphere is maintained while maintaining a stable arc providing a clean product and while maintaining, raising or lowering the nitrogen content of the metal or alloy being remelted.

It is a still further object of the present invention to provide a method of consumable electrode remelting of nitrogen-bearing iron, nickel, or cobalt-base alloys wherein the electrodes are remelted in a partial vacuum while flowing nitrogen through the furnace at a rate of from about 10 to 60 cubic feet per hour so as to maintain a partial nitrogen atmosphere within the melting zone that is capable of elevating a column of mercury to about 5 to about 50 millimeters.

Other objects and advantageous features will be obvious from the following description and drawings wherein.

The loss of nitrogen in conventional vacuum consumable electrode melting is due to the effect the vacuum has on the molten metal. Such a vacuum acts to withdraw the gaseous content of the molten metal continuously lowering the nitrogen content. Hence, the effect of the vacuum in this instance is both advantageous and disadvantageous. The withdrawal of other gaseous elements, such as hydrogen and oxygen, is necessary in order to obtain the oxide-inclusion-free material that is sought. Hydrogen, too, contributes to "dirty" steel. In addition, hydrogen may have adverse embrittling effects on the resultant product. Hence the advantages of vacuum consumable electrode melting are specifically the production of a gas-free composition; however, where it is necessary to maintain one of the gaseous elements such as nitrogen as an alloying ingredient, the consumable electrode melting process may not be employed unless this gaseous content is somehow maintained. The nitrogen level of the alloy may be maintained by employing inert gaseous atmospheres in place of the vacuum; however, if this is done, the undesirable gases such as oxygen and hydrogen are obviously not withdrawn and the advantages of consumable electrode remelting are substantially lost. Also, as recited above, the erratic performance of the arc while employing positive atmospheres renders such a practice completely impractical. As stated above, the use of partial static atmospheres i.e. partial atmospheres of nitrogen and/or argon, is not a satisfactory solution due to the fact that the arc is still unstable and it is impossible to observe the arc and control it through sight ports.

It accordance with the method of the present invention, the vacuum pumps of a consumable electrode melting furnace continue to work during arc melting, but a partial nitrogen atmosphere is maintained in the vacuum by continuously flowing through the melting chamber (including the melting crucible) a quantity of gaseous nitrogen. The nitrogen is continuously withdrawn by the vacuum pumps of the furnace so that the level of nitrogen depends entirely on how fast it is introduced into the furnace. It has been found that while flowing nitrogen in this manner, the arc is stable and the resultant consumable electrode remelted metal maintains a nitrogen content while exhibiting all of the homogeneous and inclusion-free properties considered essential for a consumable electrode remelted material.

Figure 1:
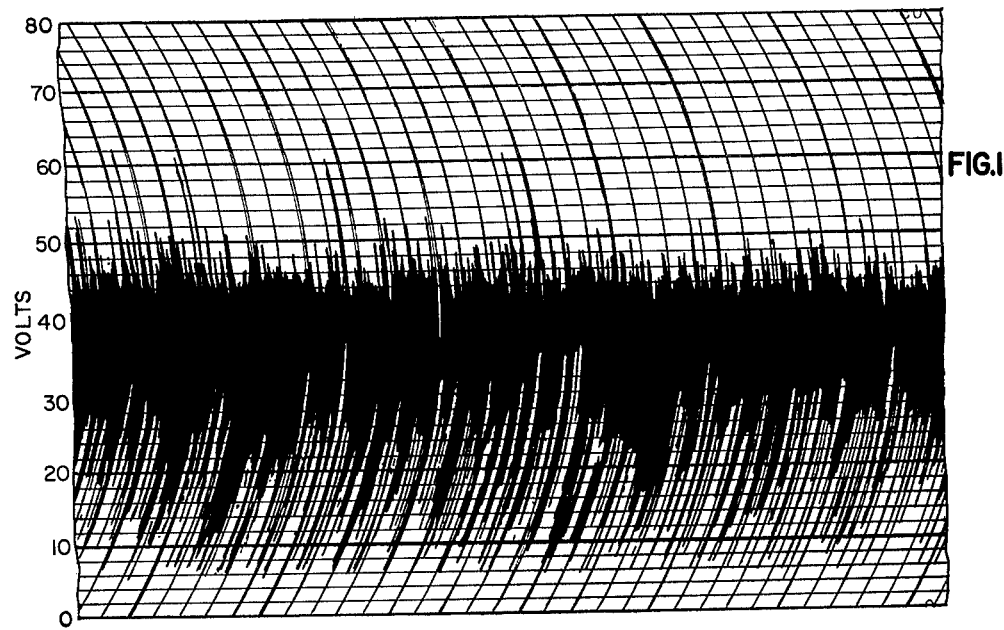
FIGURE 1 is a typical voltage chart showing the erratic behavior of the arc during consumable electrode melting under a positive argon atmosphere.
Figure 2:
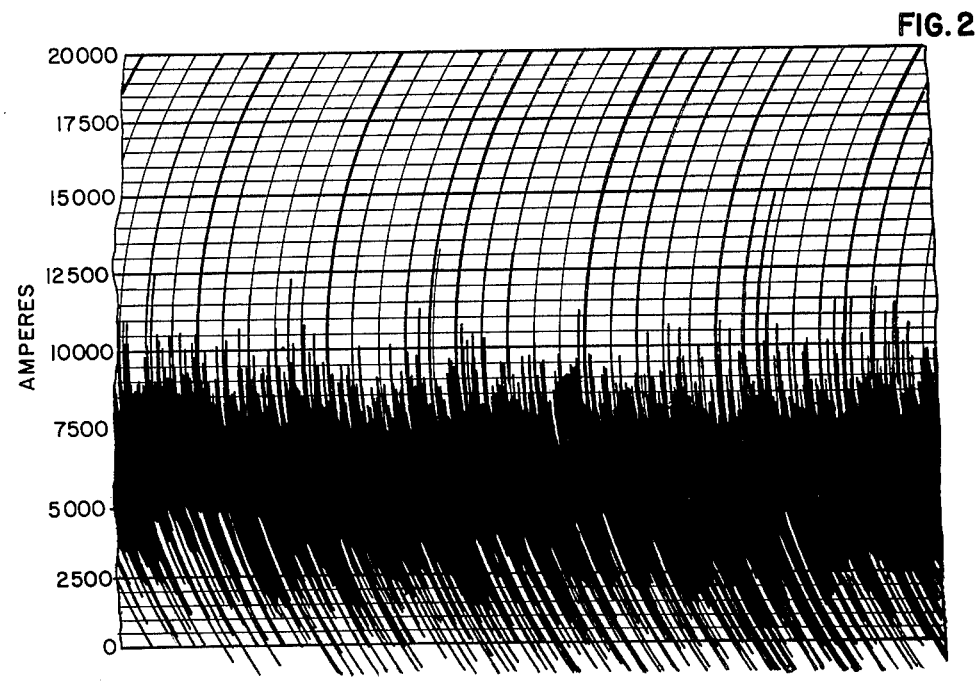
FIG. 2 shows the amperage chart corresponding to the chart of FIG. 1 showing erratic arc behavior of consumable electrode melting under a positive argon atmosphere.
Figure 3:
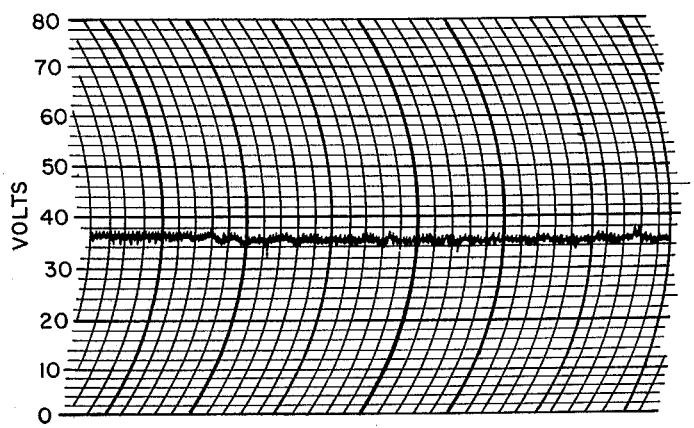
FIG. 3 is a voltage chart showing the behavior of the arc during consumable electrode melting under a flowing nitrogen-vacuum atmosphere such as is employed by the method of the present invention.
Figure 4:
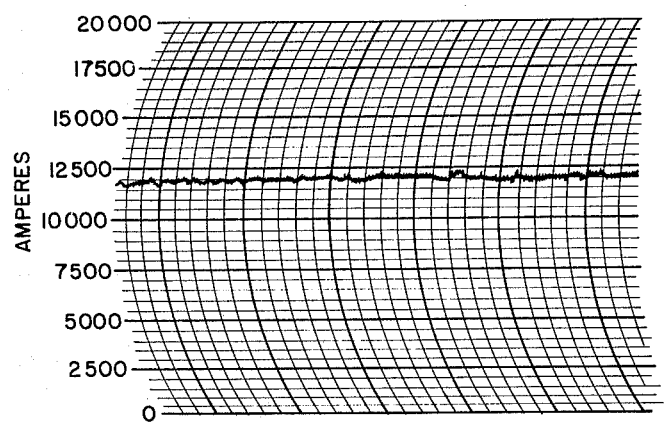
FIG. 4 is the amperage chart corresponding to the chart of FIG. 3.

Arc stability during consumable electrode melting of AM-355 alloy electrodes is demonstrated by the accompanying drawings. The charts of FIG. 1 and FIG. 2 are plots of the voltage and amperage fluctuations during consumable arc melting of a 20" diameter AM-355 electrode in a positive argon atmosphere (approximately 76 mm. above atmospheric pressure). FIGS. 3 and 4 are plots of the voltage and amperage variation during consumable arc melting of a similar electrode (20" diameter, AM-355 alloy), but while continuously flowing nitrogen at about 30 to 40 cubic feet per hour through the vacuum chamber of the furnace by continuing to operate the vacuum pumps during melting and while maintaing a partial nitrogen pressure within the melting zone sufficient to elevate a column of mercury to about 5 millimeters. It is readily observable that the voltage and amperage shown by FIG. 1 and FIG. 2 varies radically indicating an unstable arc while the voltage and amperage of FIGS. 3 and 4 are relatively steady, showing a satisfactorily stable arc.

It has been found that the nitrogen content of AM-355 alloy, which has a nitrogen content of about .090% may be susbtantially maintained by flowing nitrogen gas through the consumable electrode furance at a rate wherein the partial pressure of nitrogen or the total atmospheric pressure within the vacuum chamber will effect a rise in a column of mercury to about 20 to 30 millimeters. It has been discovered that on melting heats of different materials which, in the electrode form, were "off chemistry" in regard to the nitrogen content so that the actual content was about .030%, that the nitrogen content could be raised to within specifications (.07–.13%; preferably about .090%) by maintaining the atmospheric pressure effected almost wholly by nitrogen gas flowing through the nitrogen chamber at such a level as to cause a column of mercury to rise to about 40 to 50 millimeters. It has also been found that should the nitrogen content of the air melted material be over specification it may be lowered by maintaining a nitrogen pressure within the vacuum chamber sufficient to cause a column of mercury to rise to about 5 to 10 millimeters. A nitrogen content of a specific electrode was about .170% prior to remelting (30 to 40 cubic feet of nitrogen per hour, maintaining a column of mercury at about 5 to 10 millimeters) and the resultant consumable electrode ingot had a nitrogen content of about .090% nitrogen which was within specification ranges.

It should, of course, be borne in mind that the above melting could not be satisfactorily accomplished without flowing the nitrogen into the vacuum chamber during arc melting so as to maintain the partial nitrogen pressures desired. In other words, static partial nitrogen pressures within the aforementioned ranges would result in inclusion-bearing materials, and could not be accomplished without erratic arc behavior and impractical melting procedures.

Although the partial nitrogen pressure in a given consumable electrode furnace will depend to some extent on the flow rate of gaseous nitrogen through the vacuum chamber, it has been found that the exact size of the vacuum chamber is not critical regardless of the melting area if the flow rate of nitrogen is at least 10 cubic feet per hour and the partial pressure of the nitrogen within the chamber is at least sufficient to raise a column of mercury to 5 millimeters, a stable arc will be maintained and a nitrogen content in the arc melted metal will be sustained although perhaps lowered depending, of course, on the nitrogen content of the material being melted. It has also been found that a satisfactorily stable arc may be maintained at flow rates of up to 60 cubic feet per hour of nitrogen where the partial nitrogen pressure does not exceed that required to raise a column of mercury to 50 millimeters.

It is, of course, understood that in accordance with the method of the present invention, when discussing partial pressures of nitrogen within the vacuum chamber of a consumable electrode melting furnace, the pressure required to raise a column of mercury to from 5 to 50 millimeters effects such a rise in the conventionally defined theoretical manner, i.e. the partial pressure would effect such a rise of a mercury column only if such a column had no atmospheric pressure bearing down from above. The instruments employed in measuring such partial pressure are those commonly used for commercial laboratories and manufacturing procedures wherein gaseous pressures are measured. The following specific examples are given to illustrate the method of the present invention and in no way limit the invention to the exact embodiments set forth.

Four hundred twenty-three ingots or 2,166,433 pounds of AM-355 alloy were produced in accordance with this invention. AM-355 alloy has the following nominal composition:

*Analysis*

|    | Percent |
|----|---------|
| C  | 0.13    |
| Mn | 0.75    |
| P  | 0.02    |
| S  | 0.01    |
| Si | 0.35    |
| Cr | 15.50   |
| Ni | 4.25    |
| Mo | 2.75    |
| N  | 0.09    |

The ingot sizes produced varied and were 12", 16", 20", 26" and 28" in diameter and varied in length from 40" to 120", and weighed from 1200 to 18,000 pounds each. Vacuum melting while employing partial nitrogen was conducted as follows:

(1) Assemble the electrode and furnace.
(2) Close furnace to vacuum system.
(3) Turn on vacuum pumps and pump furnace down to 50 microns or less.
(4) Close main valve and take 5-minute vacuum drop or leak test. The furnace pressure must not rise more than 100 microns above the original reading in the 5-minute period.
(5) Cut out mechanical booster pump and let backing pump only continue to evacuate the furnace to maintain vacuum.
(6) Open small by-pass valve.
(7) Open nitrogen tank and adjust flow rate to 30–40 cu. ft. per hr. of nitrogen.
(8) Adjust furnace pressure to the specified pressure (5–40 mm.) by opening or closing the by-pass valve accordingly.
(9) Turn on rectifiers and strike arc.
(10) Maintain specified pressure during melting by adjusting the by-pass valve and/or nitrogen flow rate.
(11) Maintain pressure for 5 minutes after completion of the melt.

Some of the electrodes were "off chemistry" and exhibited nitrogen contents of about .030%, by weight, some were "on chemistry" heats with nitrogen contents of about .090%, by weight, and a few contained excessive amounts of nitrogen above that of the range shown above, being approximately .170%, by weight. The percent nitrogen content of the resulting ingots was readily controlled to specification in that the nitrogen was increased in the ingots having nitrogen deficiencies, maintained in the ingots wherein the electrodes had nitrogen contents within the above-recited ranges and decreased to salvage nitrogen wild ingots. The results were as follows:

*Percent nitrogen*

|                  | From | To   | N Pressure (mm.) |
|------------------|------|------|------------------|
| For increasing   | .030 | .085 | 40–50            |
| For maintaining  | .090 | .090 | 20–30            |
| For decreasing   | .170 | .090 | 5–10             |

Figure 5:
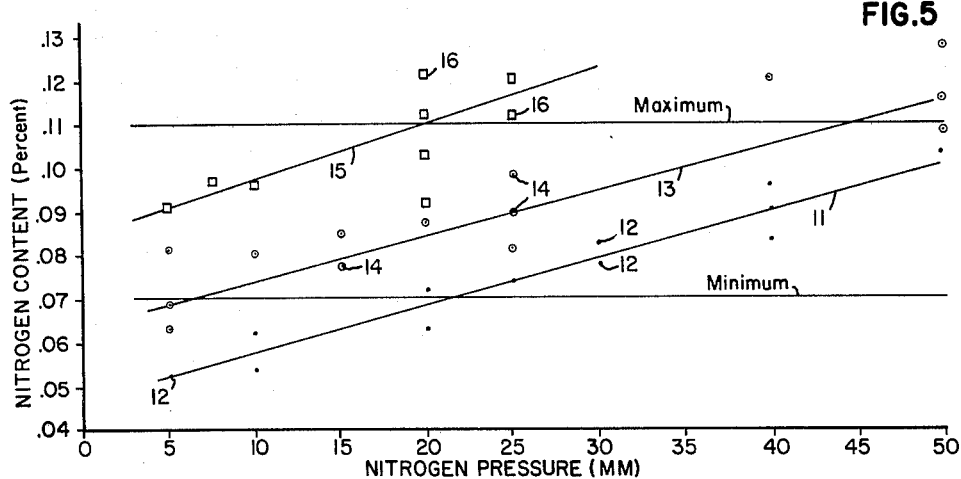
FIG. 5 is a graph showing the effect of flowing nitrogen through the sealed vacuum chamber of a consumable electrode furnace during melting on the nitrogen content of a nitrogen-bearing steel.

FIG. 5 is a graph showing the nitrogen content obtained at various nitrogen pressures and nitrogen flow rates during consumable electrode melting of AM-355 alloy while continuing to evacuate the furnace. The line or curve 11 is plotted along the solid dots 12 which represent actual consumable electrode melting of AM-355 alloy containing from about .03% to .05% nitrogen. It can be seen that when these electrodes were melted while continuously flowing nitrogen through the vacuum chamber in sufficient amounts to maintain a partial nitrogen pressure of from about 5 to 20 mm. of mercury, the nitrogen content of the resultant remelted alloy did not rise sufficiently to fall within specifications (.07–.11%); however, upon employing a flow rate (within 10 to 60 cubic feet per hour) of nitrogen that maintained a partial pressure within the melting chamber of from about 20 to 50 mm., the resultant consumable melted materials fell well within specification ranges. Curve or line 13 approximates circular plots 14 which represent actual consumable electrode melting of AM-355 alloy containing from about .08 to .11% nitrogen. With few exceptions, the analyses of these electrodes remained within specifications after remelting while employing a flow of nitrogen (10 to 60 cubic feet per hour) sufficient to maintain a column of mercury at from 5 to 50 mm. Curve or line 15, approximating square plots 16, represents AM-355 electrodes of from .12 to .17% nitrogen content. A nitrogen flow sufficient to maintain a column of mercury at 20 mm. and above is shown to result in AM-355 arc melted material with a nitrogen content above specification ranges, but flow rates sufficiently low to maintain a partial nitrogen atmosphere sufficient to raise a column of mercury from about only 5 to 10 mm. are shown to result in nitrogen content within the specification ranges.

The following data shows microcleanliness and yield data on AM-355 ingots melted as shown above. The partial nitrogen pressures for the data (1) was for material melted while maintaining a nitrogen content of about .090% using partial nitrogen pressures required to raise a column of mercury to 20 to 30 millimeters, while imposing a flow rate of from about 30 to 40 cubic feet per hour of nitrogen through the vacuum chamber. The data (2) shows comparative cleanliness ratings for AM-355 steel which was consumably electrode remelted in a positive argon atmosphere (76 mm. of mercury above atmospheric pressure). Standard ASTM test E45-51T was used to determine the cleanliness of the two different types of material. Micropolished samples were selectively and separately etched to bring out four different types of inclusion material and were then rated separately for each general type of inclusion. An image of each polished and etched sample was magnified (100×) and projected on a ground glass plate. The amount of inclusion material within two specified thickness ranges was then rated from 0 (no inclusions) to 5 (very heavy inclusions) for each thickness on a 3″ diameter circle of the projection. Ratings were as follows:

| Type inclusion | | Thickness of inclusions | |
|---|---|---|---|
| | | Thin series (t) | Heavy series (h) |
| A | Sulfide | Up to 4 microns | 4 to 6 microns. |
| B | Alumina | Up to 9 microns | 9 to 15 microns. |
| C | Silicate | Up to 5 microns | 5 to 9 microns. |
| D | Globular oxides | Up to 8 microns | 8 to 12 microns. |

Results were as follows:

*Comparison of cleanliness to ASTM–E45–51T listing worst fields*

| | A | | B | | C | | D | |
|---|---|---|---|---|---|---|---|---|
| | t* | h** | t* | h** | t* | h** | t* | h** |
| (1) | .25 | 0 | 0 | 0 | .32 | 0 | 1.64 | .45 |
| (2) | .83 | .42 | .92 | 0 | 1.2 | 0 | 2.0 | .42 |

[1] Average of 22 ratings from 10 heats melted according to this invention in a reduced pressure atmosphere of nitrogen at a pressure of from about 20 to 30 mm. of mercury with the nitrogen flowing at a rate of between 30 and 40 cubic feet per hour.
[2] Average of 12 ratings from 12 heats melted in a positive argon atmosphere 76 mm. of mercury above atmospheric pressure. The lower the number the better the cleanliness.

\* Thin series.
\*\* Heavy series.

From the results of the comparative microcleanliness data given above, it may be seen that the microcleanliness data of steel processed in accordance with the method of the present invention is far superior to material consumably electrode melted under a static positive argon atmosphere in every category of inclusions.

We claim:
1. In the process of consumable electrode remelting of metals and alloys wherein cast electrode ingots are projected into a sealed chamber where they are consumably arc melted in the presence of a substantial vacuum, the improvement of evacuating said chamber to reduce the gaseous pressure within said chamber to a level equal to or below that required to elevate a column of mercury to 50 microns, flowing an atmosphere consisting essentially of gaseous nitrogen through the chamber of said crucible while continuing to evacuate so as to maintain a partial vacuum so that the gaseous nitrogen atmosphere pressure within the chamber of said crucible is retained within a range of pressures required to elevate a column of mercury to about 5 to 50 millimeters.

2. The method of consumable electrode remelting of metals and alloys wherein cast electrode ingots are projected into a sealed chamber where they are consumably arc melted, the improvement which comprises, providing an atmosphere consisting essentially of gaseous nitrogen, which nitrogen is continuously introduced into the chamber and continuously evacuated therefrom during said remelting, the pressure of nitrogen atmosphere being maintained from about 5 to about 50 mm. of mercury.

3. The process of claim 2 wherein the flow rate of the nitrogen atmosphere is from about 10 cubic feet per hour to about 60 cubic feet per hour.

4. The process of claim 2 wherein the rate of flow of the nitrogen atmosphere is from about 30 cubic feet per hour to about 40 cubic feet per hour.

References Cited by the Examiner

UNITED STATES PATENTS

| 2,069,205 | 2/1937 | Arness | 75—59 X |
| 2,762,856 | 9/1956 | Newcomb et al. | 13—31 |
| 2,826,489 | 3/1958 | Wagner | 75—59 |
| 2,865,736 | 12/1958 | Beaver | 75—49 |

OTHER REFERENCES

Hackh's Chemical Dictionary, 3rd Edition, page 617. Published 1944 by the Blakiston Co., Philadelphia, Pa.

The Condensed Chemical Dictionary, 6th Edition, page 852. Published 1961 by Reinhold Publishing Corp., New York.

BENJAMIN HENKIN, *Primary Examiner.*

MARCUS U. LYONS, WINSTON A. DOUGLAS,
*Examiners.*